United States Patent
Blanco (10) Patent No.: US 7,661,071 B2
(45) Date of Patent: Feb. 9, 2010

(54) CREATION OF THREE-DIMENSIONAL USER INTERFACE

(75) Inventor: Victor K. Blanco, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 11/487,293

(22) Filed: Jul. 14, 2006

(65) Prior Publication Data

US 2008/0013860 A1    Jan. 17, 2008

(51) Int. Cl.
*G06F 3/048* (2006.01)
(52) U.S. Cl. .................. 715/782; 715/850; 715/852
(58) Field of Classification Search .............. 715/757, 715/782, 836, 848, 850, 852
See application file for complete search history.

(56) References Cited

U.S. PATENT DOCUMENTS

| | | | |
|---|---|---|---|
| 5,880,733 A * | 3/1999 | Horvitz et al. | 715/850 |
| 6,229,542 B1 * | 5/2001 | Miller | 715/782 |
| 6,819,344 B2 * | 11/2004 | Robbins | 715/848 |
| 7,119,819 B1 * | 10/2006 | Robertson et al. | 715/782 |
| 2001/0028369 A1 * | 10/2001 | Gallo et al. | 345/848 |

* cited by examiner

*Primary Examiner*—Weilun Lo
*Assistant Examiner*—Truc T Chuong (57) ABSTRACT

A three-dimensional (3-D) user interface (UI) creation system maps a two-dimensional (2-D), interactive UI to an 3-D object template in a 3-D scene. Once mapped, the 2-D UI functions as a simple user interface while appearing as a skin to the 3-D object. A 3-D UI creation tool applies image resources of a 2-D UI template to a 3-D wire frame template to create a 3-D UI. The system provides for rapid implementation of a 3-D UI without need for understanding a 3-D space or 3-D authoring software. The process includes preparing a 2-D UI, loading a 3-D scene of 3-D objects, and mapping the 2-D UI to a 3-D object template in the 3-D scene. A scheme file provides a specification for recreating the 3-D scene in a runtime module whereby the 3-D scene functions as a 3-D UI system, allowing interaction via a user input system.

20 Claims, 9 Drawing Sheets

CREATION OF THREE-DIMENSIONAL USER INTERFACE

BACKGROUND

Graphical user interfaces (UI) generally provide the ability for a user to interact with and control the functions of most present software programs on personal computers and other computing systems. UIs often consist of buttons, menus, toolbars, scroll bars, sliding bars, and other visual components that allow a user to select and control a function of a computing system and/or quickly identify the status certain functions of the software or computing system. UIs can also include graphical images, photo images, and position holders for other images or content, for example, windows for video feeds or advertisements, or for text entry or drawing.

Most UIs are based upon two-dimensional (2-D), interactive, graphical templates. Such templates can be developed in most, any standard graphic design program, thus allowing a designer a wide range of creativity in the "look and feel" of a particular UI. Underlying functionality may be added to a 2-D graphical template by using standard UI toolkits associated with computer operating systems and assigning particular attributes to discrete features of the graphical template. For example, a graphical feature intended to be a control button may be assigned an attribute to change appearance when selected by a user, e.g., with a mouse click or keyboard command, and assigned a control function with respect to an underlying software program that the UI controls.

Often the "skin" or aesthetic, appearance of a template can be changed by a user, e.g., by selecting different colors or graphical textures for various parts or components of the UI. In a simple example, the user may be able to change the combinations of background colors and button colors. However, even when the skin of a UI is changed, the basic layout and 2-D representation of the elements of the UI remains unchanged. In some software applications, the 2-D representation of a UI may be changed by a user through the selection of an available, alternative 2-D UI. While the position, shape, or size of the elements of the UI may be changed or rearranged, the UI is still represented in 2-D space.

Typically, it is very difficult and time intensive to create fully interactive UIs in a three-dimensional (3-D) graphic computing environment. Creation of such 3-D UIs requires considerable knowledge of 3-D authoring packages, 3-D software development practices, and adherence to a very set of stringent requirements UI elements in a 3-D scene. Further, interfaces created by existing 2-D interactive UI tools in the market (e.g., Macromedia FLASH®) do not map well into a 3-D environment or work with other UI in the 3-D scene.

SUMMARY

A 3-D UI creation system provides a platform for creating a 2-D user interface tool that allows the ease and flexibility of laying out a real, data-bound 2-D interactive UI that is capable of being mapped to any 3-D object template in a 3-D scene and interacted with as a simple user interface. A simple 3-D graphical UI creation tool as disclosed in detail herein may access a 2-D UI template and associated resources and apply them to a 3-D wire frame template to create a 3-D UI. The creation tool allows for the rapid implementation of fully interactive 3-D UI by someone with almost no understanding of 3-D space or 3-D authoring packages.

An exemplary process for 3-D UI creation takes away the complexity of understanding 3-D development. The process includes simple tasks of laying out a 2-D user interface, loading a 3-D scene of primitives, and mapping the 2-D user interface to a 3-D object template in the 3-D scene. Upon completion, the final 3-D scene can be inserted into a 3-D UI system and interacted with by using a keyboard, mouse, or other computer input system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

Implementations of a process and a set of software tools are disclosed that can be used to build an interactive 2-D UI that can then be mapped to an arbitrary 3-D surface to provide a new skin to the 3-D surface. The 3-D surface may then function as a fully interactive UI. The collection of this process and tools provide the ability to create a 3-D UI that requires substantially less time and resources to construct than traditional 3-D interfaces.

The following terms are used herein to refer to certain elements of the technology described herein. The term "skin" refers to the surface ornamentation of a 2-D or 3-D graphical template. The term "2-D graphical template" refers to a 2-D graphical design for a UI, but without any control functionality assigned to the elements of the graphical design, constructed in a 2-D graphic design program. The terms "2-D UI" and "2-D interactive UI" refer to a 2-D graphical design with functionality assigned to the elements of the graphical design. The term "2-D resource image file" refers to a file of image assets comprising a 2-D UI. The terms "3-D object," "3-D surface template," and "3-D graphical template" refer to a blank 3-D wireframe or polygonal mesh structures constructed in a 3-D graphic design program that may or may not have associated animation properties. The terms "3-D space" and "3-D environment" refer to a background constructed by a software program to provide the impression of a third dimension of depth within which the 3-D objects are placed. The term "3-D scene" refers to the combination of a 2-D UI mapped to a 3-D object within a 3-D space.

Figure 1:
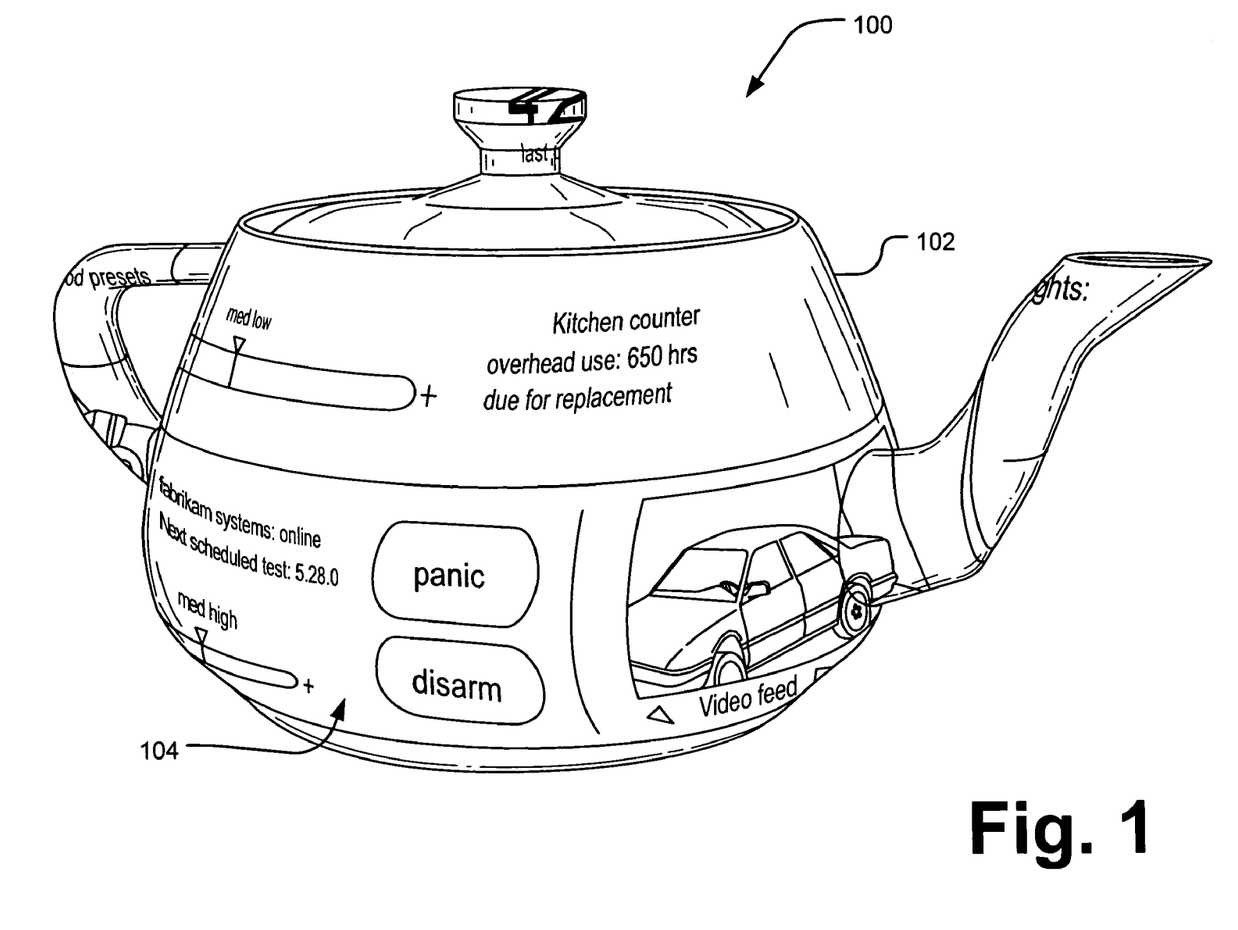
FIG. 1 is a schematic diagram of a 2-D UI mapped to an arbitrary 3-D surface in the form of a tea pot.

An example of such a 3-D UI 100 created using the tools and systems described herein is depicted in FIG. 1. As shown in FIG. 1, an arbitrary 3-D surface template 102, in this case in the form of a teapot, has been transformed into the 3-D UI 100. A 2-D resource image 104 has been applied to the surface of the 3-D surface template 102. The 3-D UI is fully interactive because of the functionality assigned to the elements of the 2-D resource image.

Figure 2:
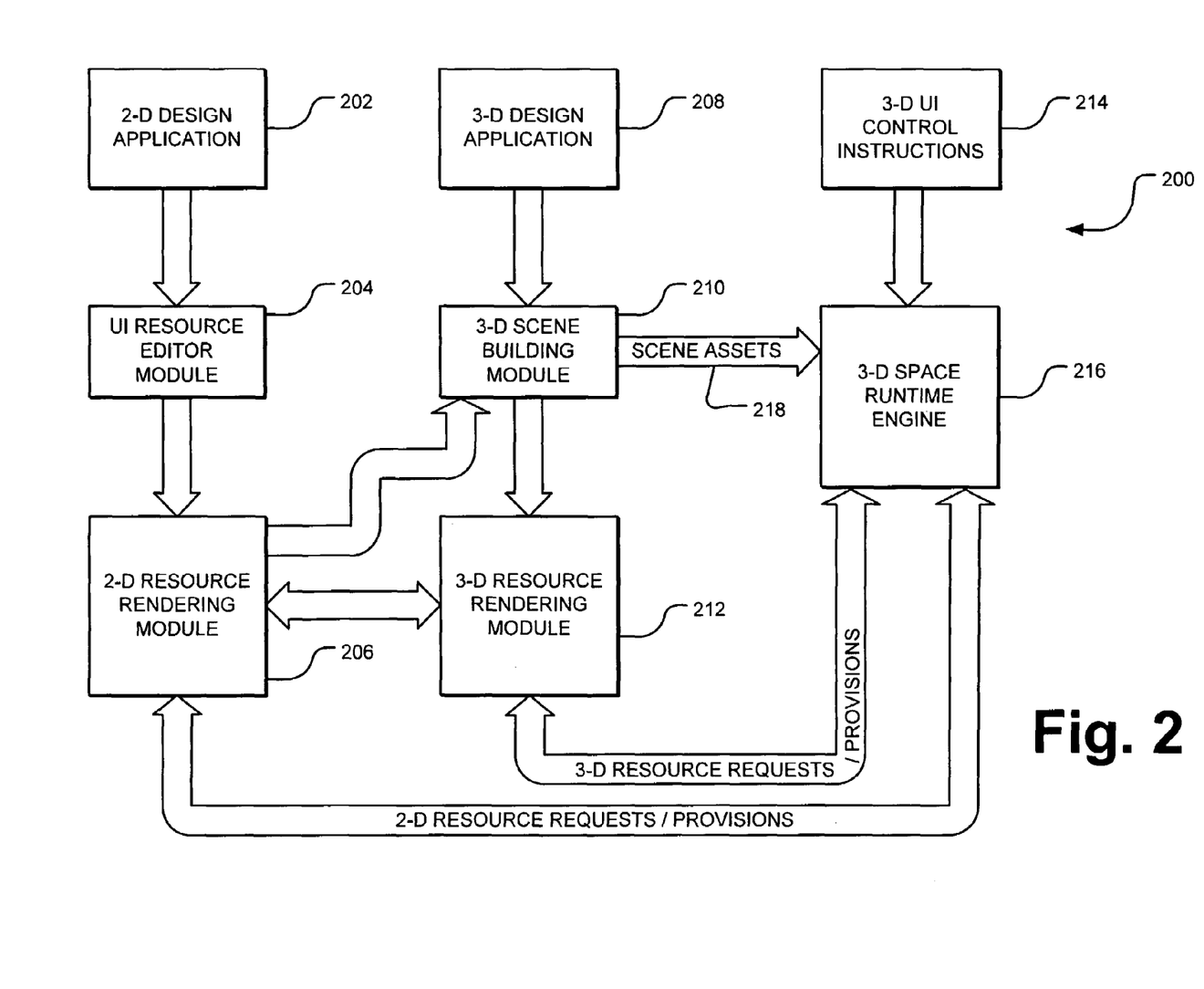
FIG. 2 is a schematic diagram of an implementation of modules for creating a 3-D U"from a 2-D U" and a 3-D framework.
Figure 4:
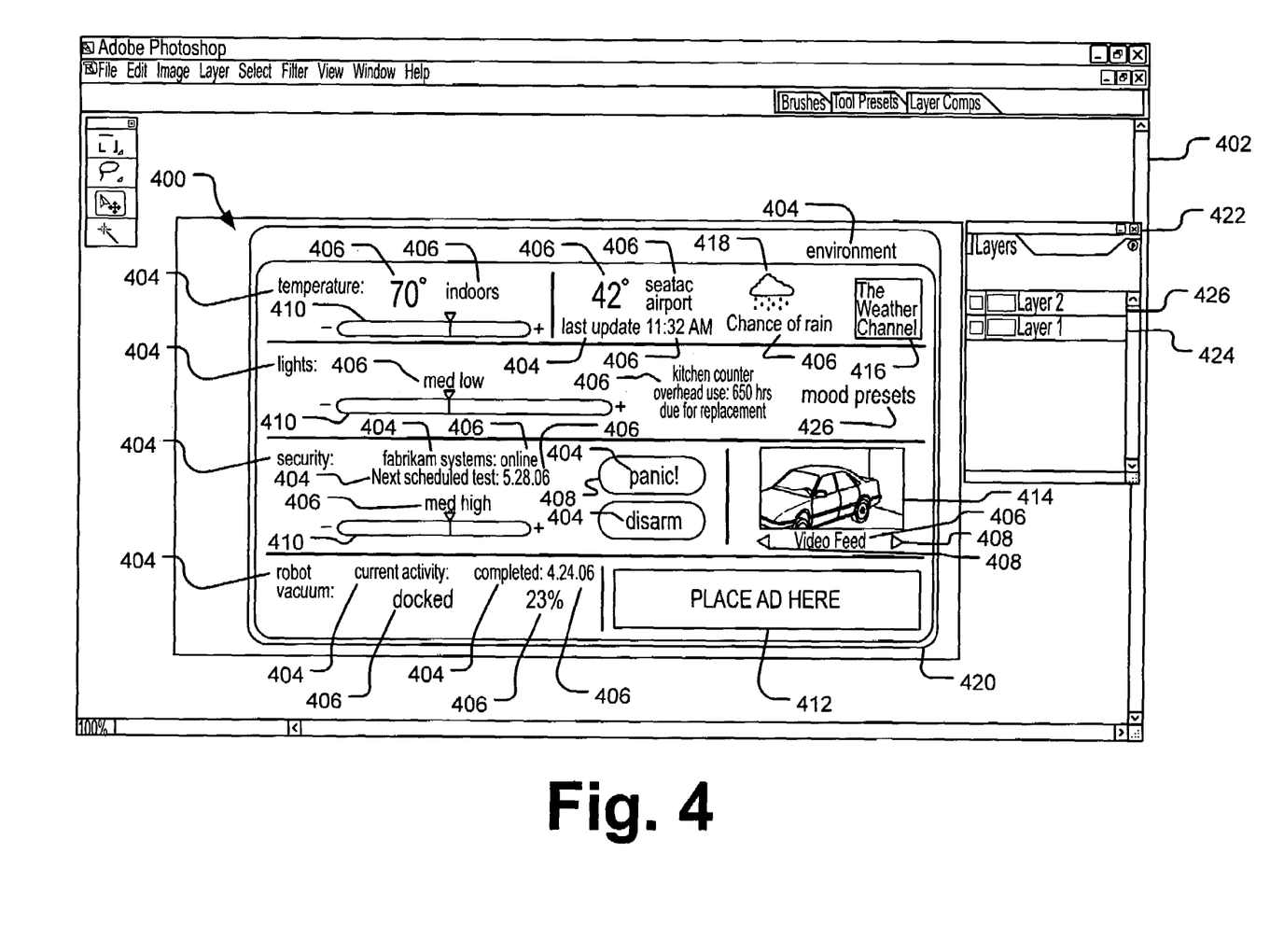
FIG. 4 is a schematic diagram of a 2-D graphical template created in a 2-D design program.

An exemplary implementation of a system 200 for creating the 3-D UI 100 of FIG. 1 or other 3-D UIs is depicted in FIG. 2. A 2-D design application 202 may initially be used to prepare a 2-D graphical template 400 as depicted in FIG. 4 and further described herein. Exemplary 2-D design applications may include Adobe PHOTOSHOP®, Adobe ILLUSTRATOR®, Adobe FLASH®, Quark XPRESS®, and other similar graphic design software. Image assets may be designed within the 2-D design application 202 in layers to be saved as separate files.

Image assets of the 2-D graphical template 400 are imported into a UI resource editor module 204, which is used to assign behaviors to one or more of the image assets as further described below. The assigned behaviors may be inert properties, e.g., text size or color, or they may control functionality of the image assets. Such assigned behaviors may also include the assignment of navigation instructions to the UI to indicate how user inputs are interpreted for selecting and activating particular image assets in the UI. The image assets and associated functionality information are saved as a 2-D resource image file, which is then accessible by a 2-D resource rendering module 206 in the final creation of the 3-D UI as further described below.

Figure 5:
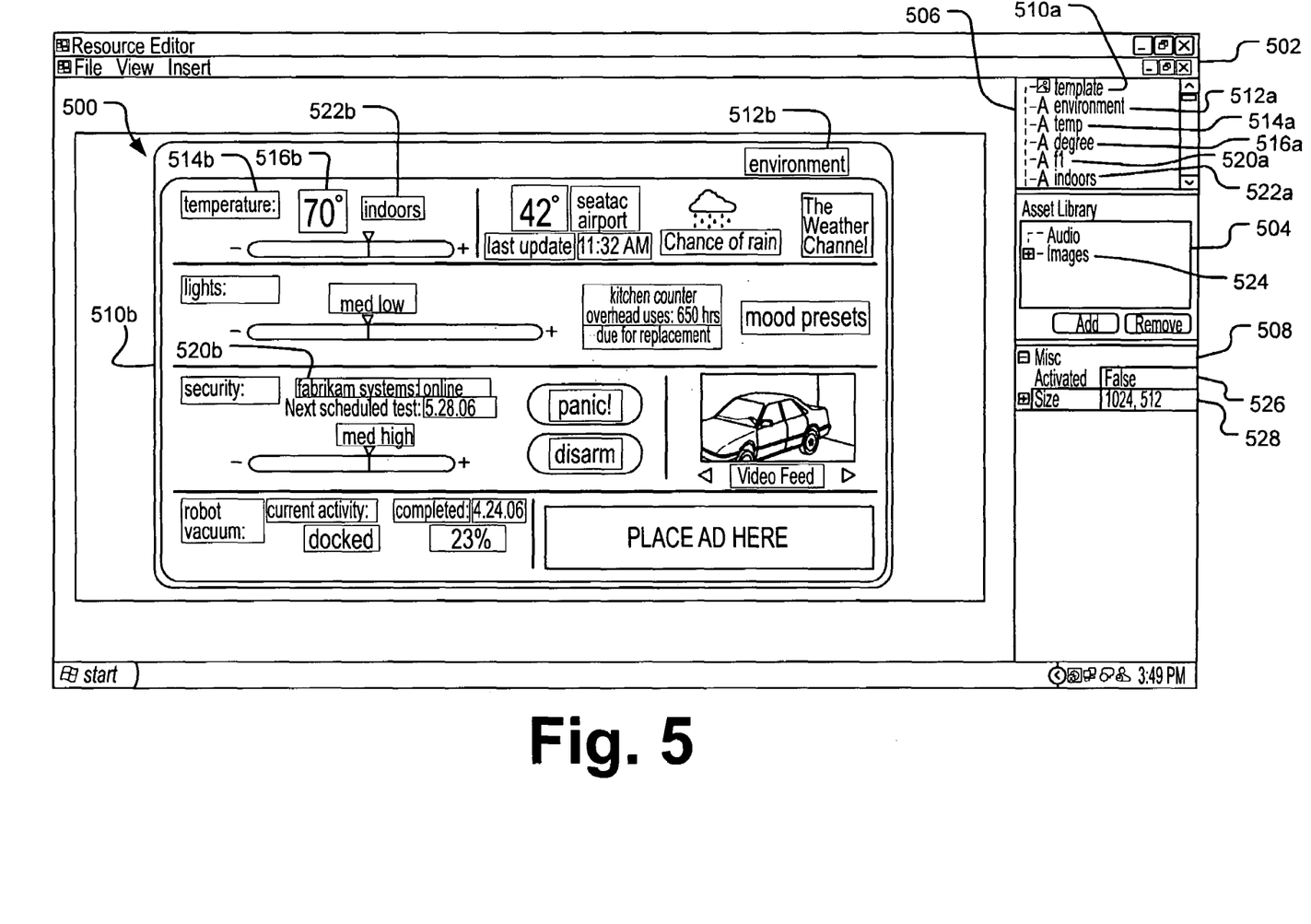
FIG. 5 is a schematic diagram of a 3-D object template created in a 3-D design program.

In addition to the 2-D design application 202, a 3-D design application 208 is used to create a 3-D object 500 as depicted in FIG. 5 and further described herein. Exemplary 2-D design applications may include AUTODESK® AUTOCAD®, AUTODESK® 3D Studio MAX, SOLIDWORKS®, and other similar 3-D authoring software. The 3-D object may simply be a 3-D wireframe or it may be provided with animation features for movement within 3-D space. The 3-D objects created in the 3-D design application 208 are saved or exported for import into a 3-D scene building module 210. In one implementation, a specialized file export program may be used to transform the 3-D object files from the 3-D design application 208 into a format more easily used by the 3-D scene building module 210. The 3-D object files are also accessible by a 3-D resource rendering module 212 in the final creation of the 3-D UI as further described below.

In addition to the 3-D object files, the 3-D scene building module 210 may request the 2-D resource rendering module 206 to access 2-D resource image files for import into the 3-D scene building module 210. The 3-D objects and the image assets in the 2-D resource image files may be combined within the 3-D scene building module 210 to create a 3-D scene within a 3-D environment. Selected 2-D resource image files and corresponding images assets may be mapped as textures to the surface of a selected 3-D object in order to create a functional 3-D UI as further described below.

The 3-D scene building module 210 allows the graphic designer to view and position selected 3-D objects within a 3-D space, coordinate the respective motions of such 3-D objects in the circumstance that such 3-D objects are animated, and view the results and effects of mapping image assets of particular resource image files to particular 3-D objects. The combinations of 3-D objects and 2-D resource image files are considered 3-D scenes. While a 3-D scene is built, the particular combination of 3-D objects and 2-D resource image files is catalogued by the 3-D scene building module 210.

The 3-D scene building module 219 may be considered an authoring tool for developing descriptions of particular combinations of image assets and 3-D objects to create a particular 3-D UI scene. In an exemplary embodiment, these descriptions or "scene assets" 218 may be in the form of an extensible mark-up language (XML) file 218 listing the file names and assigning desired combinations of image assets to 3-D objects. Thus, the 3-D scene building module 210 does not actually save the graphic combination of image assets and 3-D objects in a file for later rendering. Instead, only the scene asset file 218 describing the particular configuration is saved.

The scene asset file 218 may be passed from the 3-D scene building module 210 to the 3-D space runtime engine 216 to provide instructions for instantiation of a particular 3-D UI. In addition to scene assets, the ultimate appearance and functionality of a particular 3-D scene may also be influenced by 3-D UI control instructions 214. Such 3-D UI control instructions 214 may be written by a programmer and provide instructions for populating elements of the 3-D UI scene. For example, certain text elements in a 3-D UI scene may be populated with labels according to instructions provided in the 3-D UI control instructions 214. Such labels would thus appear on the elements in the instantiated 3-D UI. In a further example, certain text elements in a 3-D UI may be updatable, e.g., environmental temperature readings taken periodically. The 3-D UI control instructions 214 may cause such updated text information to be passed to the 3-D space runtime engine 216 for replacement of prior information displayed on image assets appearing in the 3-D UI.

Note, as indicated above and in the relationship between the 3-D space runtime engine 216, the 2-D resource rendering module 206 and the 3-D resource rendering module 212 in FIG. 2, that the 3-D space runtime engine 216 relies on the 2-D resource rendering module 206 to provide the requested 2-D image assets from the resource image files and the 3-D resource rendering module 212 to provide the requested 3-D objects for combination in forming the 3-D UI. Note, as further described below with respect to FIG. 3, the functionality of the 3-D UI remains in the image assets of the 2-D resources files. Recall that the 3-D UI is instantiated in real-time based upon the description of the scene asset file 218 and the 3-D UI control instructions 214. Thus, there is no separate 3-D UI file that holds all of the elements of the 3-D UI. Thus, the requests made to the 2-D resource module 206 may also pass navigation input and control commands received from the user via input controls.

The 2-D resource module 206 may interface with the operating system of the computer in order to effectuate any command received from user input within the 3-D UI. The 2-D resource module 206 may further provide update information to the 3-D space runtime engine 316 to alter the appearance of a selected 2-D image asset texture mapped to a 3-D object. For example, if a user input activates a button, the button in the 2-D resource image file may be designed to change appearance, e.g., glow or change color, to indicate the selection. This change in the appearance of the image asset may be reflected in the 3-D UI by provision of an updated image asset to the 3-D space runtime engine 216 for replacement in the 3-D UI. Note also that the 2-D resource rendering module 206 and the 3-D resource rendering module 212 may communicate with each other to coordinate the provision of requested image assets and 3-D objects to the 3-D space runtime engine 216.

Figure 3:
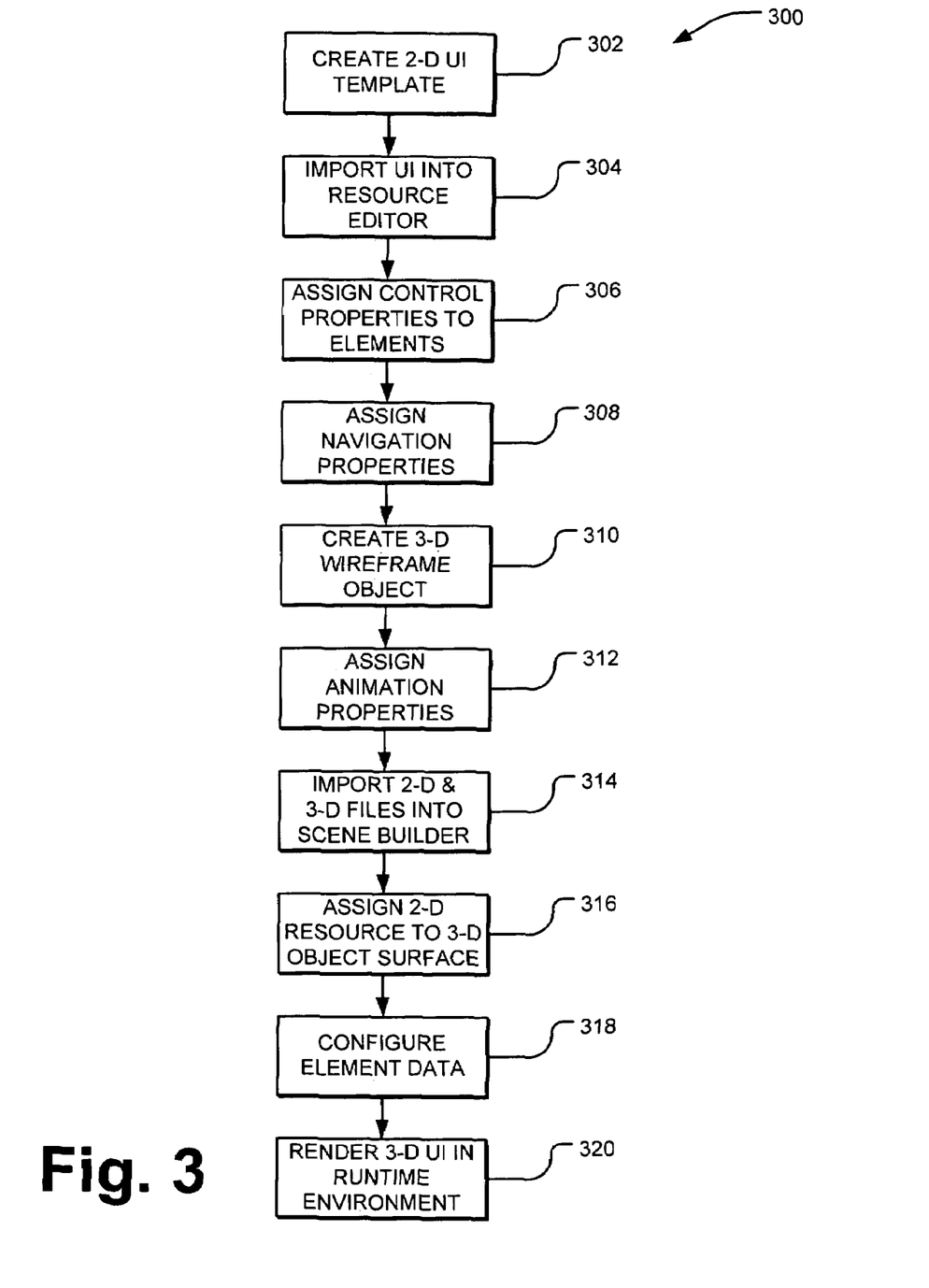
FIG. 3 is a flow diagram of exemplary operations for creating a 3-D UI from a 2-D UI and a 3-D object template.

The flow diagram of FIG. 3 sets forth a series of exemplary operations in an implementation of a 3-D UI creation process 300 utilizing the components of the system 200 of FIG. 2. These operations may be more easily understood in the context of application to an exemplary 3-D UI. Images illustrating several of the operations or stages in the 3-D UI creation process 300 of FIG. 3 are depicted in FIGS. 4-8 and will be referred to for visual reference in the following description of the 3-D UI creation process 300.

In a typical computer UI design and build process, several different actors may be involved, for example, a project manager, a graphic designer, and a programmer. The project manager may initially define and document the parameters for a 3-D UI including the structural layout of a 2-D graphical template, and control definitions and navigation functions to transform the 2-D graphical template into a functional 2-D UI. For example, the program manager may specify an 'Environment' screen as a UI for information about and control of automated functions for a house, e.g., temperature, lights, and security. The 'Environment' screen may also be designed to provide other information of interest to the homeowner.

The project manager may specify a UI scene that contains, e.g., multiple static text elements, multiple updatable text elements, a number of button controls, a number of slider controls, a video window, an advertisement window, and a number of temperature indicators. The project manager may also specify a definition of behavior for each control (e.g., button, slider, etc.). The specification may also have instructions for representing user input as navigation of the elements of the 3-D UI.

Based upon the design specification of the project manager, a graphic designer may then in a first creation operation 302 create a 2-D graphical template using the 2-D design application 202. Again, the 2-D design application 202 may be standard, graphic design software, for example, Adobe PHOTOSHOP®, Adobe ILLUSTRATOR®, Adobe FLASH®, Quark XPRESS®, and other similar graphic design software. An exemplary 2-D graphical template 400 is depicted in FIG. 4 as a layered Adobe PHOTOSHOP® file that is a graphical representation of the 2-D UI template specified by the project manager. However, the file is not interactive or dynamic at this time in the creation process 300.

As indicated above, the exemplary 2-D graphical template 400 of FIG. 4 may be created in an Adobe PHOTOSHOP® environment 402. The 2-D graphical template 400 may be composed of several design elements or image assets, for example, static text elements 404, updated text elements 406, control buttons 408, control sliders 410, an advertising window 412, a video feed window 414, a logo window 416, a graphic 418, a link to another UI screen 426, and a background 420. Other elements may be included in the 2-D graphical template 400 and any combination of elements in any layout or format may be used in creating a UI design. None of the image assets of the graphical template are actually functional resulting from the creation operation 202; the image assets are merely placeholders designed to create the desired look and feel of the ultimate UI.

The 2-D graphical template 400 may be created in layers as indicated by the "Layers" toolbar 422. For example, as shown in FIG. 4, the background 420 may be created in a first layer 424 and the image assets may be created in a second layer 426. Alternately, each of the image assets may be created in separate layers. The graphic designer may then save the individual layers of the 2-D graphical template 400 from the 2-D design software as separate image files. For example, the background 420 along with the advertising window 412, the video feed window 414, and the logo window 416 may be saved as a first image file, e.g., a JPEG file; the static text 404 and updated text 406 may be saved as a second image file; and each of the image assets comprising the control buttons 408 and control sliders 410 may be saved as third and fourth image files, respectively.

Returning to FIG. 3, in a first import operation 304, the graphic designer may import the separate layer files saved from the 2-D design application 202 comprising the image assets of the 2-D graphical template 400 into the 2-D UI resource editor module 204. The graphic designer may then reconfigure the separate image assets into a layout 500, shown in the Resource Editor environment 502 of FIG. 5, recreating the 2-D graphical template 400 of FIG. 4. Note that use of the asset images in a 2-D resource image file need not be limited to recreating a 2-D graphical template previously constructed, but instead may be used to create any design for a 2-D UI within the resource editor module 204. The Resource Editor environment 502 may provide an asset library toolbox 504 for importing 2-D resource image files and associated image assets into the resource editor environment 502. As showing in FIG. 5, two resource image files have been imported into the asset library toolbox 504.

An asset label toolbox 506 may provide functionality for assigning unique identifiers to each element placed in the layout 500 within the Resource Editor environment 502. Exemplary identifiers in FIG. 5 include a 'template' ID 510a designated as an image element, which corresponds to the background area 510b; an 'environment' ID 512a designated as a text element, which corresponds to the static text element label "environment" 512b; a 'temp' ID 514a designated as a text element, which corresponds to the static text element label "temperature" 514b; a 'degree' ID 516a designated as a text element, which corresponds to the updatable text element label "70°" 516b; an 'f1' ID 520a designated as a text element, which corresponds to the static text element label "fabrikam systems" 520b; and an 'indoors' ID 522a designated as a text element, which corresponds to the updatable text element label "indoors" 522b.

As indicated in the first assignment operation 306 in FIG. 3, the graphic designer may define image assets as static text elements, updatable text elements, or otherwise assign properties or intelligent controls to image assets of the 2-D resource image file within the Resource Editor environment 502. The image assets may be assigned properties specific to that image asset, e.g., text properties may include attributes of color, font, and alignment. Alternately, asset images for buttons may be assigned specific image states for mouse focus and text that is present on the button, as well as related functional actions. When an image asset is selected in the asset label toolbox 506 or within the template 510b, a properties grid 508 populates depicting attributes associated with that identifier and corresponding image asset. For example, in the exemplary image of FIG. 5, when the template ID 510a is selected, the properties grid 508 is populated with a first entry 526 indicating that the template image has no active features, e.g., animation, and a second entry 528 displaying the size of the background image.

Once all graphic, text, and control elements are in place and behave as the project manager specified, the designer may then assign directional navigation instructions to image assets as indicated in the second assignment operation 308 in FIG. 3. Navigation instructions may define how a user can navigate to each functional or control image asset within the 2-D UI using an input device, e.g., mouse movement and clicks and keyboard keystrokes.

Once the properties, control functions, and navigation functions have been assigned to image assets, the designer may save the final configuration as a 2-D resource image file. All image assets and functional properties used to create the 2-D UI may be embedded in the final saved 2-D resource image file. The images in the 2-D resource image files may act as the primary UI surface-type in the 3-D space runtime engine 216. This 2-D resource image file is advantageous compared to creating conventional 3-D controls to represent the primary user interface elements because it allows rapid creation of fully interactive scenes by someone with no understanding of 3-D space or 3-D authoring packages.

Similar to the creation of the functional 2-D UI, the project manager may specify a structural layout for a 3-D wireframe object that will function as a surface template to host the 2-D UI. The project manager may also define animation features specify how the 3-D object may animate into and out of a 3-D scene, as well as any necessary animations in response to user interaction with the 3-D UI based upon the 3-D object. For example, the project manager could define a 'bouncing ball' animation that moves the 3-D object within the 3-D scene as if the 3-D object were bouncing against surfaces.

Figure 6:
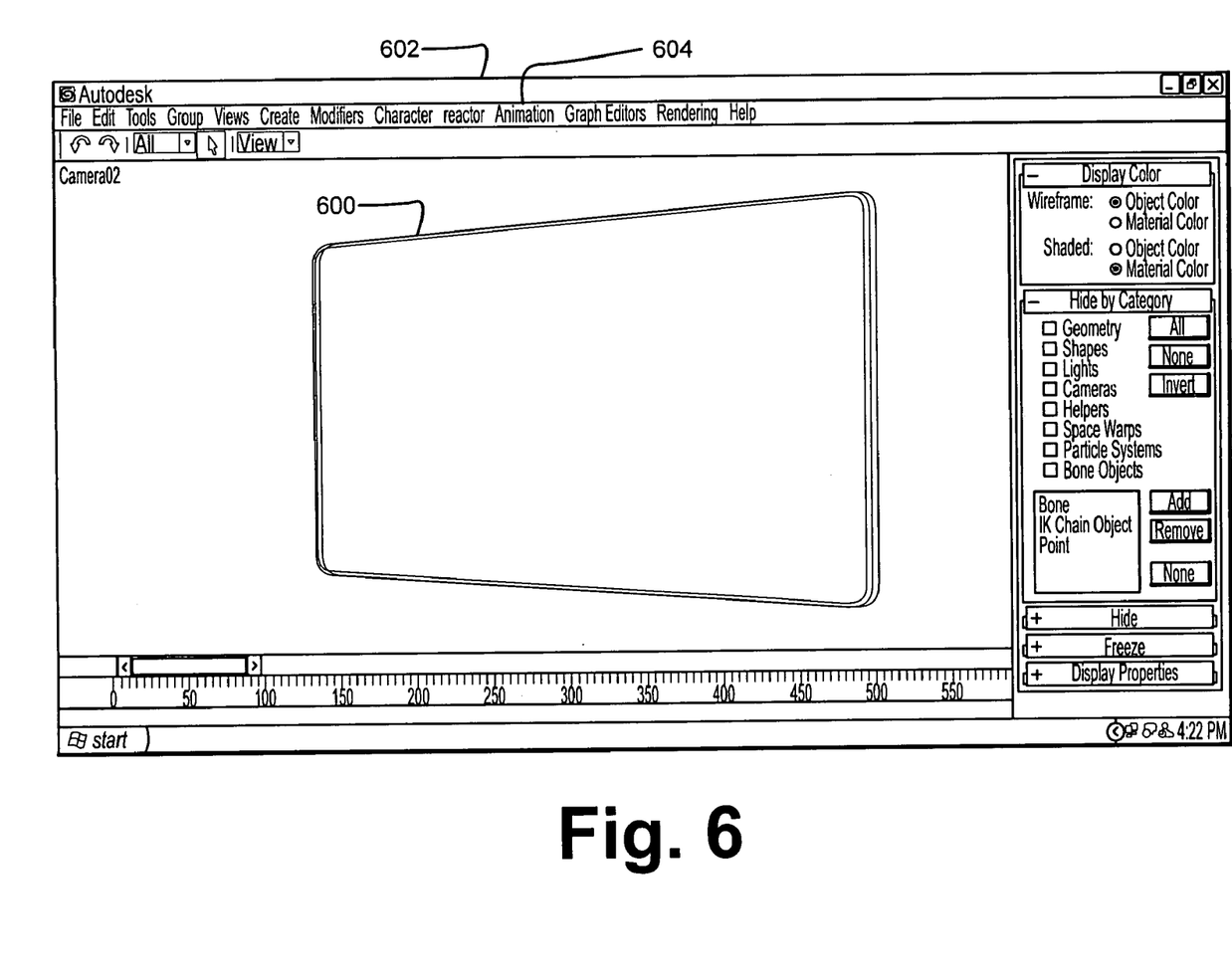
FIG. 6 is a schematic diagram of a 2-D UI created in a 2-D resource editor tool.

Returning to FIG. 3, in the second creation operation 310, the designer next creates a wireframe for a 3-D object in the 3-D graphic design application 208. The 3-D objects or surface templates may be 3-D polygonal meshes created in a 3-D authoring package. The 3-D objects may be specifically designed to provide surfaces for simply rendering 2-D resource image files. An exemplary 3-D wireframe 600 authored using a standard 3-D design environment 602, in this implementation AUTODESK® 3-D Studio MAX, is depicted in FIG. 6. The 3-D surface template 600 of FIG. 6 is a simple, large, flat plane in 3D space to which a 2-D resource image file may be assigned. Because the 3-D surface template 600 is flat, there is no distortion of an applied 2-D resource image. However, an interactive 2-D resource image or individual image assets may be applied to a 3-D object of any shape, for example, as shown in FIG. 1.

As indicated in FIG. 3, once the wireframe of the 3-D object is complete, the graphic designer in the third assignment operation 312 may assign appropriate animation properties to the 3-D object using animation tools 604 in the 3-D design application to meet the specifications set by the project manager. The 3-D design application 208 allows the graphic designer to review and revise the animation properties assigned to the object to ensure that the movement of the 3-D object in 3-D space meets the project specifications.

Once the 3-D object is completed, including the assignment of any animation properties, the 3-D object may be exported from the 3-D design application in an image format suitable for access and control by the 3-D space runtime engine 216 of FIG. 2. This export format may be a common format, or a format specifically designed for optimal integration with the 3-D space runtime engine 216.

Figure 7:
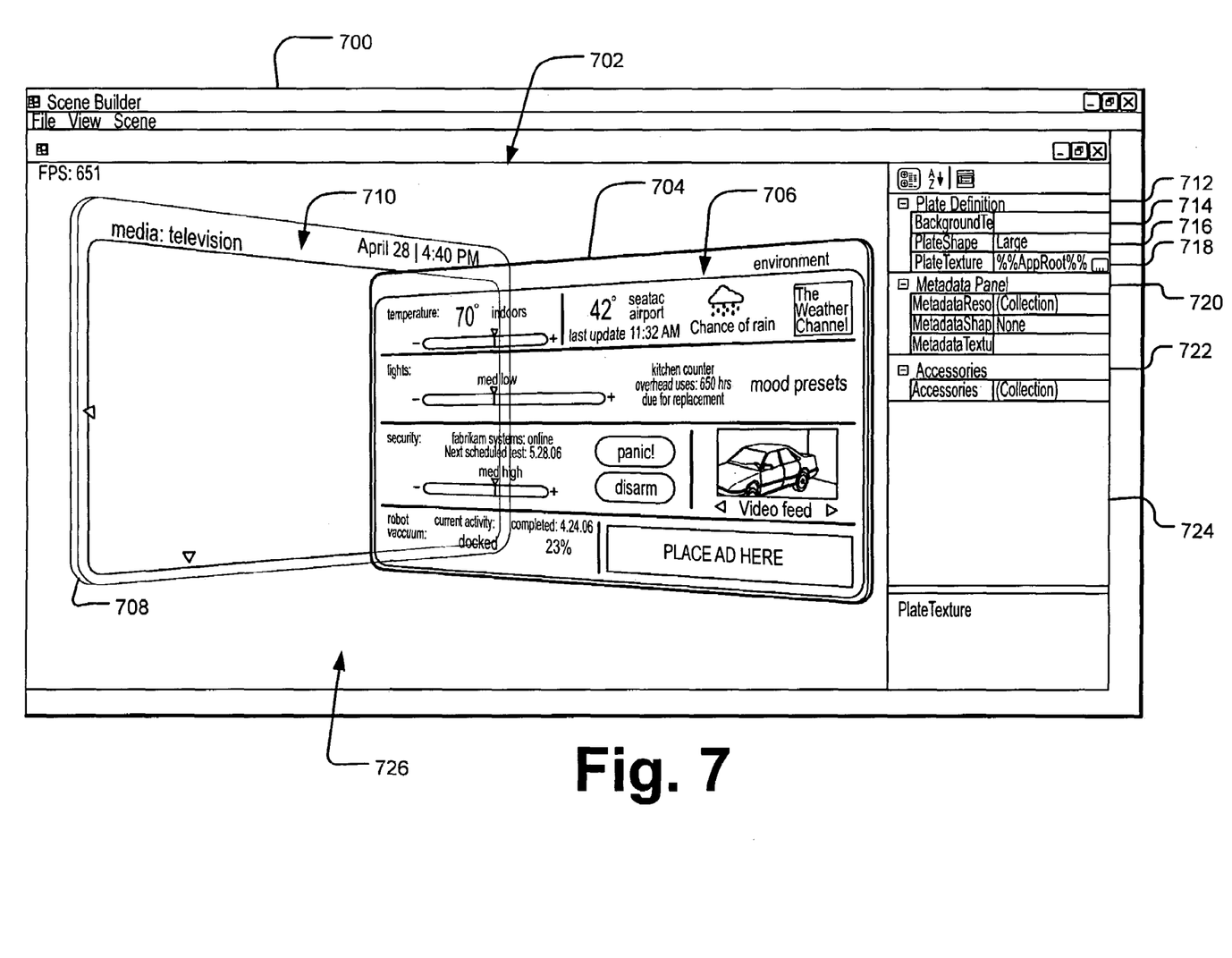
FIG. 7 is a schematic diagram of a 3-D scene created in a 3-D scene building tool.

Once a library of both 2-D resource image files and 3-D object files has been created by the graphic designer, in a second importing operation 314 indicated in FIG. 3, the designer may import the library of 2-D resource image files and 3-D object files into the 3-D scene building module 210 to compose a fully interactive 3-D scene for use within the 3-D space runtime engine 216. An exemplary 3-D scene building application interface is presented in FIG. 7. Upon initiation of the 3-D scene building module 210, an empty 3-D space 702 is presented in the application environment 700. The designer may select 3-D object files to load into the 3-D space 702. In the example of FIG. 7, a first 3-D object 704 and a second 3-D object 708 are placed within the 3-D space 702 to create a 3-D scene 726.

The graphic designer may next select one of the previously imported 3-D objects 704, 708 in the 3-D scene 726 e.g., with a mouse cursor. Once one of the 3-D objects 704, 708 is selected, a contextual menu 724 may be provided on the right side of the application environment 700. This contextual menu 724 may expose properties grids 712, 720, 722 of the 3-D objects 704, 708 that the graphic designer can change as desired. The properties grids 712, 720, 722 identify the properties associated with any particular image asset constructed in the 3-D scene 726. The graphic designer may select individual image assets from a mapped 2-D resource image in the composed 3-D scene 726, and change the element data for that image asset. For example, if a 2-D UI had a text placeholder for some textual element, the graphic designer can enter or select the ID of that text element and enter new text that is appropriate for the 3-D scene 726.

In the example of FIG. 7, the first properties grid 712 labeled "Plate Definition" may be related to a first 3-D object 704, the second property menu 720 labeled "Metadata Panel" may be related to a second 3-D object 708, and a third property menu 722 labeled "Accessories" may be related to a third 3-D object (not shown). A first exemplary property 714 in the properties grid 712 of the first object 704 may be a background texture to be applied to the object 704. A second exemplary property 716 may be a size attribute for the chosen 3-D object 704. In the example of FIG. 7, the size of the selected 3-D object 704 is set to "large." A third exemplary property 716 may be a texture definition 718 for the 3-D object 704, which indicates a 2-D resource image file to apply to the 3-D object 704.

Upon choosing to apply a texture definition 718, e.g., for the 3-D objects 704, 708 the graphic designer may be prompted to browse their computer system memory for the corresponding 2-D resource image file. Upon selection of a 2-D resource image file, the 2-D resource image file is loaded in to the 3-D scene building application environment 700. The selected 2-D resource image file is applied to the 3-D object using texture mapping coordinates that were previously assigned to that object by the 3D design application 208. As shown in FIG. 7, a first interactive UI 706 from a 2-D resource image file is mapped to the first 3-D object 704 and a second interactive UI 710 from a 2-D resource image file is mapped to the second 3-D object 708. The once blank surface templates of the 3-D objects 704, 708 now render fully interactive UIs 706, 710 that are capable of receiving and reacting to both mouse and keyboard input.

Mapping the 2-D resource image files to the 3-D objects may be performed by one of many known texture filtering methods. In the present implementation, the 2-D resource image files may be considered "textures" applied to the surfaces of the 3-D objects. Texture filtering may generally be understood as assigning textels (i.e., pixels of a texture) to corresponding points on a 3-D object. Exemplary texture filtering methods may include antialiasing, mip-mapping, bilinear filtering, and anisotropic filtering. Note that such texture filtering methods performed within the 3-D scene building application environment 700 are also performed by the 3-D space runtime engine 216 as further described below.

The graphic designer may continue mapping the 2-D resource image files to the surfaces of the 3-D objects until all of the 3-D objects in the 3-D scene 726 are hosting a 2-D UI. Within the 3-D scene building application environment 700, the graphic designer is able to preview various combinations of 2-D resource images mapped to 3-D objects, and further view any transition animations of the 3-D scene 726 to preview how the 3-D objects in the 3-D scene 726 interact.

Once the 3-D scene 726 is complete, in a configuring operation 318 as indicated in FIG. 3, the graphic designer may configure a specification for the composed scene to a file that is used to construct a corresponding functional 3-D UI in the 3-D space runtime engine 216. The specification may be in the form of a scene schema; e.g., an XML file, that describes the 2-D resource image files and 3-D objects needed to construct a particular 3-D UI. The scene schema may further include particular labels, e.g., for text elements, that correspond to a specific 3-D scene. The scene schema may then be made available to software developers in a database or directory of available 3-D scenes for use in the development of 3-D UIs for software programs. The scene schema may be automatically written by the 3-D scene building module 210 by documenting the assets, relationships, and properties constructed and assigned by the graphic designer when building the 3-D scene.

As noted, a software developer may be provided access to a collection of various 2-D resource image files, 3-D objects, and scene schemas developed by the graphic designer. The combination of these assets provides the software developer with the information and resources necessary to implement a functional, interactive 3-D UI in a rendering operation 320 as part of an application in a runtime environment as depicted in FIG. 3.

To initiate the rendering operation 320, the software developer may access one or more scene schema files defining a 3-D scene. The scene schema may provide instructions to the 3-D space runtime engine 216 UI in selections, orders, arrangements, animations, and mappings of 3-D objects and resource image files for creation of particular 3-D UI scenes. The scene schema may further define navigation alternatives among the image assets and 3-D objects within the 3-D scene and functional properties of individual image assets. Using the instructions and information in the scene schema, the 3-D space runtime engine may pass requests to the 2-D resource rendering module 206 and the 3-D resource rendering module 212 for access to specific resource image files and 3-D objects.

Figure 8:
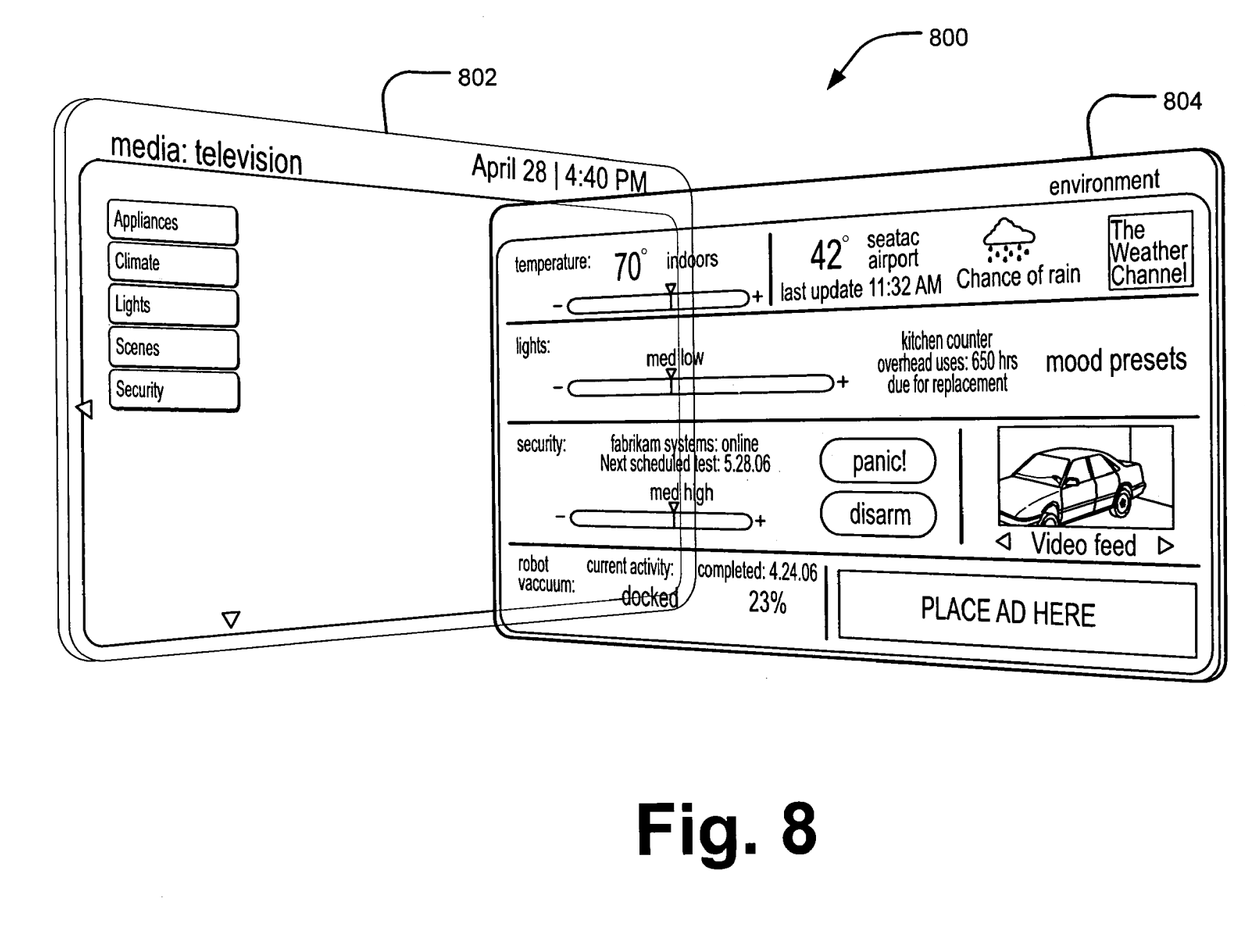
FIG. 8 is a schematic diagram of a 3-D UI created in a 3-D space runtime engine.

Once the elements of a 3-D UI scene are instantiated, for example, as depicted in FIG. 8, the software code prepared by the software developer may instruct that all mouse, keyboard, and other user input be passed to the 3-D UI so the user can interact with and navigate among the controls exposed by the designer in the 2-D UI texture mapped to the 3-D objects. In the diagram of FIG. 8, a first 3-D UI 802 and a second 3-D UI 804 make up the final, composed 3-D scene 800. Note, by way of example, the second 3-D UI 804 is based upon the 2-D graphic template 400 of FIG. 4 with added functional properties mapped as a texture onto the 3-D wireframe 600 of FIG. 6.

Note again that input commands by a user for control of elements and/or navigation among elements may be passed by the 3-D space runtime engine 216 to the 2-D resource rendering module 206 as the control of elements remains in the 2-D UI. Based upon a control input by a user, the 2-D resource rendering module 206 may update the 2-D UI configuration and provide a revised 2-D UI to the 3-D space runtime engine 216 for re-mapping on the associated 3-D object. For example, if a button element in the 3-D UI is selected or focused by a mouse-over, the UI specification may call for the button element to be visually highlighted. This input action is passed to the 2-D resource rendering module 206, which provides an updated 2-D interface with a highlighted button to be mapped as a replacement texture on the 3-D object.

If a software developer wants to base software functionality on certain interactions by a user with the 3-D UI or by other events, the developer may provide a "handle" to the 3-D object in the software. The software application may then monitor events affecting that 3-D object. Events may include, for example, button selections, timers within the software, and action requests by the software. For example, if 'Temperature' were the name of a button within the 3-D UI and if the event corresponds to "Temperature button pressed," in addition to the 3-D space runtime environment 216 seeking graphic modifications from the 2-D resource image files, the application may monitor the event and perform some additional function. For example, the software developer may have written the software to perform any number of actions, for example, changing the UI to a different 3-D scene with more explicit environmental controls, requesting an updated temperature for a designated geography for insertion and display, or communicating with a thermostat to adjust the temperature.

A software program utilizing a 3-D UI may also be written to monitor 3-D objects for events. Further, the software program can also be designed to identify and set properties on elements in a 2-D resource image file. The developer would simply get a handle again to the 3D object, and pass in parameters to a property function such as "Set Temperature Text to '75 degrees'". The 'Temperature Text' element in the Resource Image was assigned by the artist, and the text in that field would re-render with the new setting set by the developer.

Figure 9:
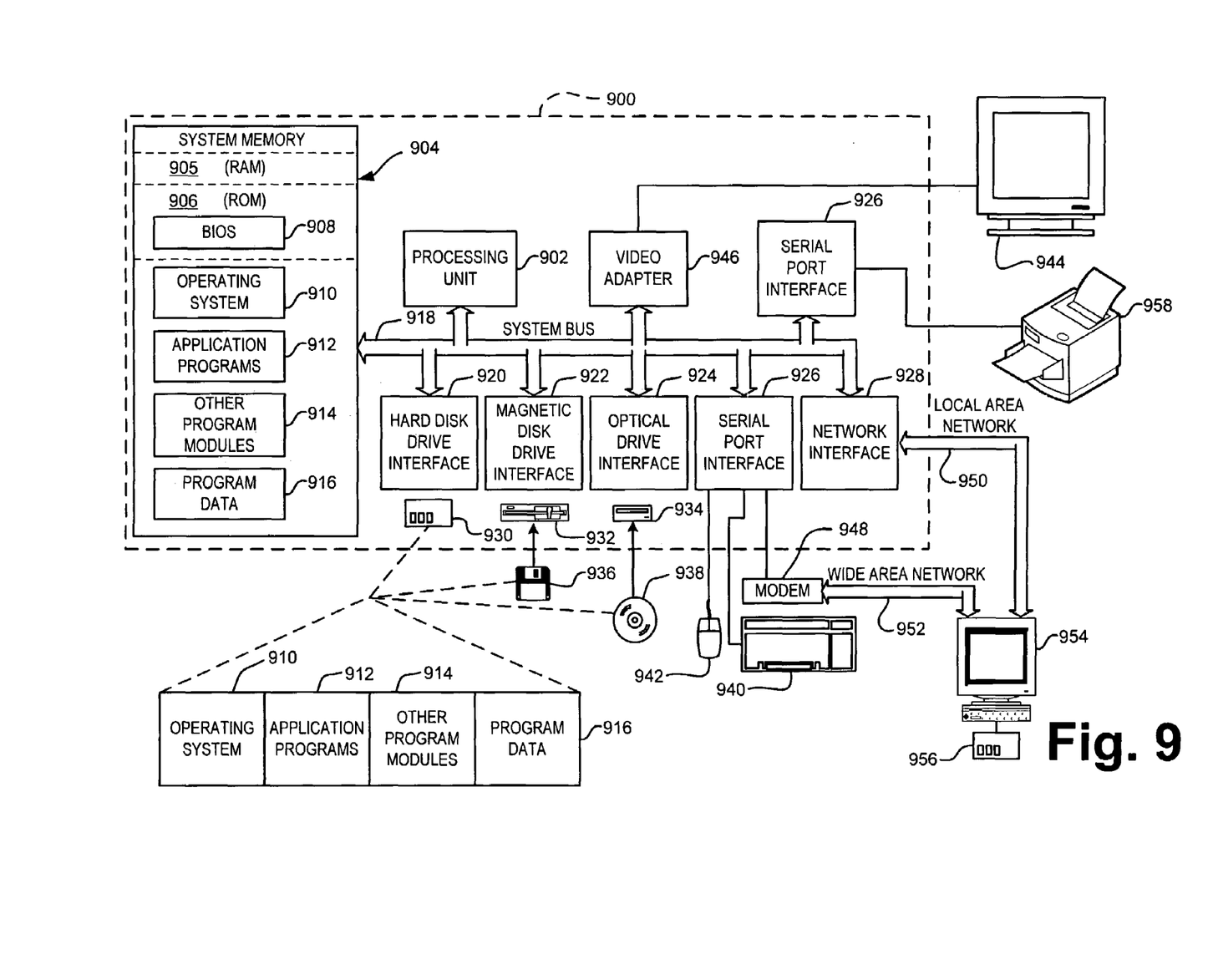
FIG. 9 is a schematic diagram of a general purpose computing system for implementing various modules and functions of the 3-D UI creation system.

An exemplary hardware and operating environment as shown in FIG. 9 may be used to implement the systems and processes described above. The environment includes a general purpose computing device in the form of a computer 900, including a processing unit 902, a system memory 904, and a system bus 918 that operatively couples various system components, including the system memory 904 to the processing unit 902. There may be only one or there may be more than one processing unit 902, such that the processor of computer 900 comprises a single central processing unit (CPU), or a plurality of processing units, commonly referred to as a parallel processing environment. The computer 900 may be a conventional computer, a distributed computer, or any other type of computer; the invention is not so limited.

The system bus 918 may be any of several types of bus structures including a memory bus or memory controller, a peripheral bus, a switched fabric, point-to-point connections, and a local bus using any of a variety of bus architectures. The system memory 904 may also be referred to as simply the memory, and includes read only memory (ROM) 906 and random access memory (RAM) 905. A basic input/output system (BIOS) 908, containing the basic routines that help to transfer information between elements within the computer 900, such as during start-up, is stored in ROM 906. The computer 900 further includes a hard disk drive 930 for reading from and writing to a hard disk, not shown, a magnetic disk drive 932 for reading from or writing to a removable magnetic disk 936, and an optical disk drive 934 for reading from or writing to a removable optical disk 938 such as a CD ROM or other optical media.

The hard disk drive 930, magnetic disk drive 932, and optical disk drive 934 are connected to the system bus 918 by a hard disk drive interface 920, a magnetic disk drive interface 922, and an optical disk drive interface 924, respectively. The drives and their associated computer-readable media provide nonvolatile storage of computer-readable instructions, data structures, program modules and other data for the computer 900. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 930, magnetic disk 932, optical disk 934, ROM 906, or RAM 905, including an operating system 910, one or more application programs 912 (e.g., the 2-D and 3-D design applications), other program modules 914 (e.g., the 2-D UI resource builder and the 3-D scene building module), and program data 916 (e.g., the 2-D resource image files and the schema specifying components of a 3D UI). A user may enter commands and information into the personal computer 900 through input devices such as a keyboard 940 and pointing device 942, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 902 through a serial port interface 926 that is coupled to the system bus 918, but may be connected by other interfaces, such as a parallel port, game port, or a universal serial bus (USB).

A monitor 944 or other type of display device is also connected to the system bus 918 via an interface, such as a video adapter 946. In addition to the monitor 944, computers typically include other peripheral output devices, such as a printer 958 and speakers (not shown). These and other output devices are often connected to the processing unit 902 through the serial port interface 926 that is coupled to the system bus 918, but may be connected by other interfaces, such as a parallel port, game port, or a universal serial bus (USB).

The computer 900 may operate in a networked environment using logical connections to one or more remote computers, such as remote computer 954. These logical connections may be achieved by a communication device coupled to or integral with the computer 900; the invention is not limited to a particular type of communications device. The remote computer 954 may be another computer, a server, a router, a network personal computer, a client, a peer device, or other common network node, and typically includes many or all of the elements described above relative to the computer 900, although only a memory storage device 956 has been illustrated in FIG. 9. The logical connections depicted in FIG. 9 include a local-area network (LAN) 950 and a wide-area network (WAN) 952. Such networking environments are commonplace in office networks, enterprise-wide computer networks, intranets and the Internet, which are all types of networks.

When used in a LAN 950 environment, the computer 900 may be connected to the local network 950 through a network interface or adapter 928, which is one type of communications device. When used in a WAN 952 environment, the computer 900 typically includes a modem 948, a network adapter, or any other type of communications device for establishing communications over the wide area network 952. The modem 948, which may be internal or external, is connected to the system bus 918 via the serial port interface 926. In a networked environment, program modules depicted relative to the personal computer 900, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated It is intended that all matter contained in the above description and shown in the accompany drawings shall be interpreted as illustrative only of particular embodiments and not limiting. Changes in detail or structure may be made without departing from the basic elements of the invention as defined in the following claims.

What is claimed is:

1. A method for authoring an interactive, three-dimensional user interface comprising:

creating a three-dimensional object having a texture definition property;

defining animation properties for the three-dimensional object;

creating a two-dimensional texture using a two-dimensional graphic design application;

defining an interactive behavior of the two-dimensional texture in a two-dimensional resource image file stored on a computer, wherein the two-dimensional texture comprises one or more image assets, and the interactive behavior is defined by navigation instructions for selecting and activating the one or more image assets in response to user input;

assigning the two-dimensional resource image file as the texture definition property of the three-dimensional object;

mapping the two-dimensional resource image file to the three-dimensional object by distorting the two-dimensional texture onto the three-dimensional object and applying the interactive behavior of the two-dimensional texture to the three-dimensional object in a three-dimensional space to form a three-dimensional user interface having interactive behavior within the distorted two-dimensional texture on the three-dimensional object; and coordinating a behavior of the two-dimensional texture and the three-dimensional object in the three-dimensional space.

2. The method of claim 1, wherein the interactive behavior is further defined by user interface functionality in the one or more image assets in response to user input.

3. The method of claim 1, wherein
the one or more image assets comprise one or more of a static text element, an updated text element, a control button, a control slider, an advertising window, a video feed window, a logo window, a graphic, a link to a user interface screen, and a background.

4. The method of claim 1 wherein
the animation properties for the three-dimensional object are defined using animation tools in a three-dimensional (3-D) design application.

5. The method of claim 1 wherein the coordinating operation further comprises specifying a scene schema for implementing the three-dimensional interactive user interface in the three-dimensional space.

6. The method of claim 5, wherein the coordinating operation further comprises implementing instructions in addition to the scene schema to effect the behavior the two-dimensional texture and the three-dimensional object in the three-dimensional space.

7. A computer-readable storage medium having computer-executable instructions performing a computer process implementing the method of claim 1.

8. A method for implementing an interactive, three-dimensional user interface comprising:
reading instructions from a scene schema for creating a three-dimensional scene;
instantiating the three-dimensional scene in three-dimensional space on a computer by importing a two-dimensional resource image file defining interactive behavior of a two-dimensional user interface into a three-dimensional space, wherein the two-dimensional user interface comprises one or more image assets, and the interactive behavior is defined by navigation instructions for selecting and activating the one or more image assets in response to user input;
importing a three-dimensional object having a texture definition property into the three-dimensional space;
defining animation properties for the three-dimensional object;
assigning the two-dimensional resource image file as the texture definition property of the three-dimensional object; and
mapping the two-dimensional resource image file to a surface of the three-dimensional object by distorting the two-dimensional resource image file onto the three-dimensional object and applying the interactive behavior of the two-dimensional user interface to the surface of the three-dimensional object to thereby form a three-dimensional user interface having interactive behavior within the distorted two-dimensional resource image file on the three-dimensional object;
assigning user input commands to the two-dimensional user interface; and
activating behaviors associated with the two-dimensional user interface in response to the user input commands.

9. The method of claim 8, wherein
the assigning user input commands operation further comprises
sending the user input commands from the three-dimensional space to a resource image rendering module;
the activating operation further comprises
constructing a revised two-dimensional UI from the two-dimensional resource image file reflecting the activated behaviors; and
the second importing operation further comprises
importing the revised two-dimensional user interface into the three-dimensional space to change the three-dimensional scene.

10. The method of claim 9 further comprising
waiting for an event;
sending notification of the event from the three-dimensional space to a resource image rendering module;
constructing a revised two-dimensional user interface from a resource image file reflecting the activated behaviors; and
importing the revised two-dimensional user interface into the three-dimensional space to change the three-dimensional scene.

11. The method of claim 8 further comprising
designing a two-dimensional graphical template; and
assigning one or more behavioral properties to the two dimensional graphical template to create the two-dimensional user interface.

12. The method of claim 11, wherein the second assigning operation further comprises associating directions for navigating among elements of the two-dimensional graphic template in response to user input.

13. The method of claim 11, wherein the second assigning operation further comprises associating functions responsive to user input with one or more elements of the two-dimensional graphic template.

14. The method of claim 13 further comprising receiving instructions, in addition to the scene schema, for instantiating the three-dimensional scene.

15. The method of claim 14, wherein the instructions alter at least one of the behavioral properties.

16. The method of claim 8 further comprising
waiting for an event; and,
upon occurrence of the event, altering at least one of the behavioral properties.

17. A computer-readable storage medium having computer-executable instructions performing a computer process implementing the method of claim 8.

18. A system for creating an interactive, three-dimensional user interface comprising:
a two-dimensional user interface editor module for attaching behavioral attributes to a two-dimensional graphical template to create an interactive, two-dimensional user interface and for saving a two-dimensional resource image file defining interactive behavior of the two-dimensional user interface, wherein the two-dimensional user interface comprises one or more image assets, and the interactive behavior is defined by navigation instructions for selecting and activating the one or more image assets in response to user input;
a three-dimensional scene building module that defines animation properties for the three-dimensional object, assigns the two-dimensional resource image file as a texture definition property of a three-dimensional object, maps the two-dimensional resource image file to a surface of the three-dimensional object to distort the two-dimensional resource image file onto the three-dimensional object and to apply the interactive behavior of the two-dimensional user interface to the surface of a three-dimensional object to create a three-dimensional user interface having interactive behavior within the distorted two-dimensional resource image file on the three-dimensional object, and specifies a scene schema for implementing the three-dimensional scene in three-dimensional space;

a two-dimensional resource rendering module that manages one or more two-dimensional user interface resources;

a three-dimensional resource rendering module that manages one or more three-dimensional user interface resources; and a three-dimensional space runtime module that implements the scene schema by importing the two-dimensional user interface from the two-dimensional resource rendering module and the three-dimensional object from three-dimensional resource rendering module and instantiates the three-dimensional user interface on a computer in three-dimensional space.

19. The system of claim 18 further comprising a two-dimensional graphic design program for designing the two-dimensional graphical template.

20. The system of claim 18 further comprising a three-dimensional graphic design program for designing the three-dimensional object.

* * * * *